Nov. 7, 1944.   W. NAIDA   2,362,393
ALTIMETER FOR OBTAINING ACTUAL ALTITUDE OF AIRCRAFT
Filed Oct. 28, 1942
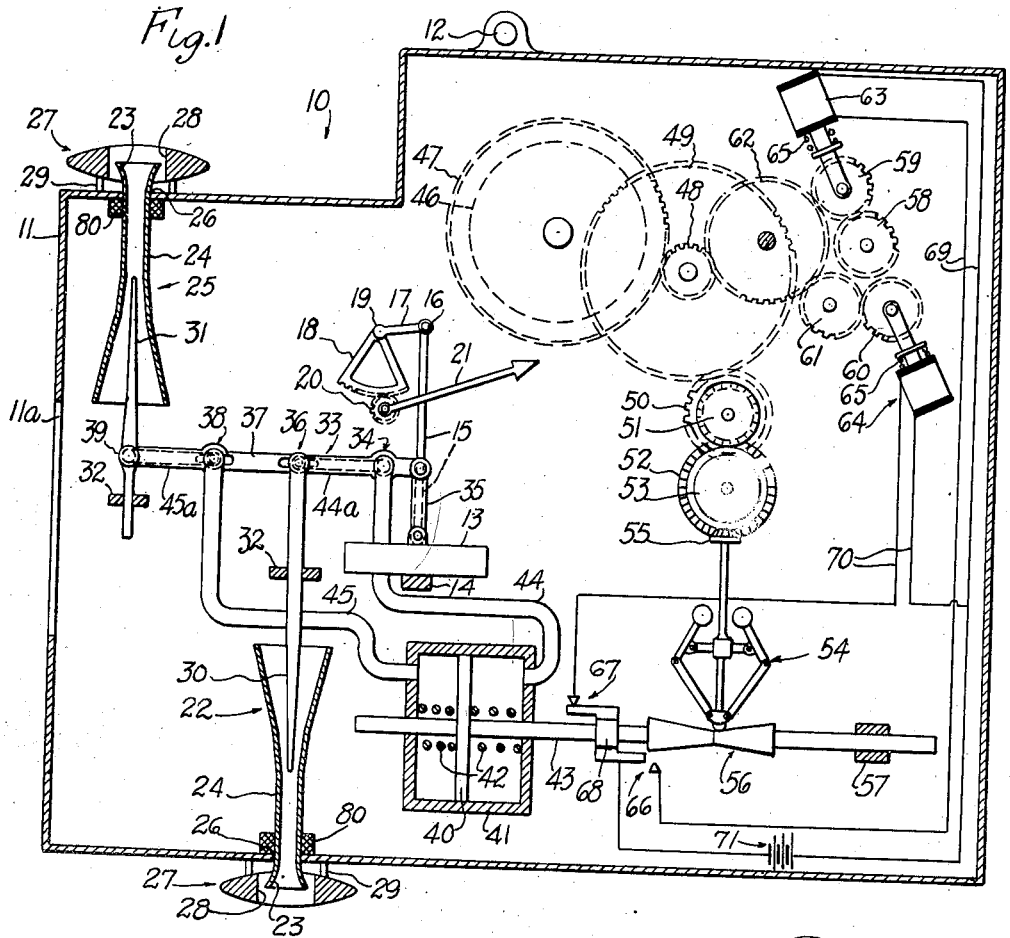
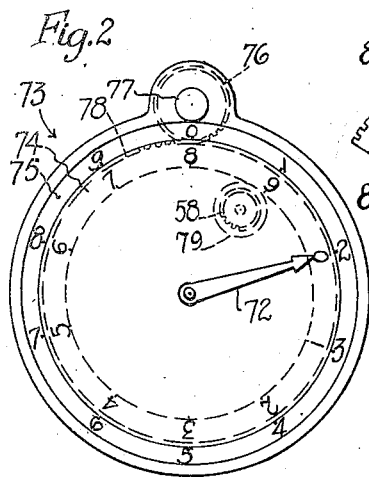
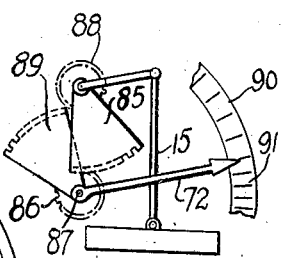
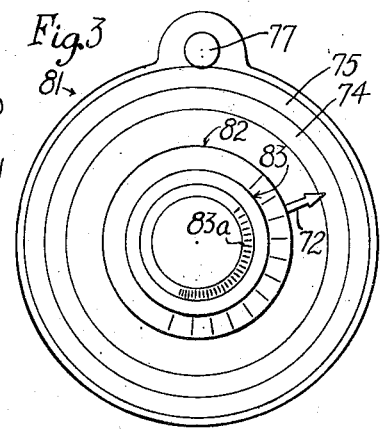
INVENTOR.
William Naida
BY Louis Schumacher,
Atty.

Patented Nov. 7, 1944

2,362,393

UNITED STATES PATENT OFFICE 2,362,393

ALTIMETER FOR OBTAINING ACTUAL ALTITUDE OF AIRCRAFT

William Naida, New York, N. Y., assignor of one-half to Emilio Varrone, Brooklyn, N. Y.

Application October 28, 1942, Serial No. 463,715

4 Claims. (Cl. 73—387)

This invention relates to indicating instruments for aircraft and to devices for the comparative indication of dynamic conditions of the flow of gases.

One object of the invention is to provide an altimeter having improved air-sensitive means for indicating the substantially true altitude of an aircraft in flight, irrespective of a sudden drop in barometric pressure such as occurs in the case of a storm or other unusual condition.

Another object of the invention is to provide an improved altimeter responsive to dynamic air conditions for indicating the loss in altitude of an aircraft during a sudden drop in barometric pressure.

Another object of the invention is the provision of an altimeter having improved means for correlating the operation of an aneroid with the vertical component of air pressure for automatically reducing the altimeter reading by an amount corresponding to a decrease in altitude caused during a sudden reduction in the density or lifting power of the atmosphere.

Another object of the invention is the provision of an improved altimeter wherein aneroid means are used for indication of altitude as well as for correction or modification of vertical dynamic energy indication for different densities of the air as distinguished from dynamic energy variation due to varying relative air velocity.

Another object of the invention is to provide an altimeter having improved means for indicating the resultant change in altitude as between the climbing of an aircraft and the effect of a sudden drop in barometric pressure.

Another object of the invention is to provide an altimeter having improved means including indicating means for the reading due to normal pressure, the resettable reading due to the loss of altitude of the aircraft during a sudden drop in barometric pressure, and the resultant substantially true altitude reading, each of these readings being constantly shown, simultaneously with the others.

Another object of the invention is to provide an altimeter having improved means whereby the size of scale readings for certain altitude ranges is changed by improved simplified mechanism.

Another object of the invention is to provide improvements in the art relating to the observation of certain physical characteristics of gases, particularly pressure and dynamic energy, including conditions encountered in the atmosphere by aircraft, applicable not only to altimeters but also to many other devices and for different purposes, comprising the following:

1. To utilize a Pitot tube for dynamic energy indication.

2. To employ a Venturi tube for control of dynamic energy, as a means of adjustment, and for other purposes.

3. To coordinate streamlined means with an indicator of one component of dynamic energy so as to obtain, for example, an indication of vertical air flow independently of horizontal air flow, of a mass of air.

4. To combine a venturi with a Pitot tube to enhance the dynamic energy available for easier relative indication.

5. To movably associate a venturi with a Pitot tube for adjustment of the indication of the latter.

6. To use a venturi with a Pitot tube movable by a pressure sensitive device such as an aneroid for changing the indication of the latter in accordance with variation in the air density.

7. To employ a pressure sensitive device such as an aneroid in association with means for dynamic energy indication to impose a force or effect modifying said indication in direct or inverse proportion to varying gas density.

8. To obtain the resultant effect between vertical upward and downward relative air flow to thus allow for a combination of movement and density change effects.

9. To change the speed of operation or of indication of a timing device such as a clock according to the dynamic energy of a gas, or according to such a condition together with the varying density of the gas; and to accomplish this by a single movement, with the aid, for instance, of a governor.

10. To affect the rate of a time mechanism according to atmospheric conditions as herein mentioned, without drawing power from an aneroid, or the like.

11. To cause an indicator for the drop of an aircraft to begin to operate automatically and to cease operation when the drop ceases, and to be adapted to be reset to zero.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a diagrammatic view showing a device embodying the invention, with parts in section and other parts removed.

Fig. 2 is a view in elevation showing the dial face of the device.

Fig. 3 is a modification.

Fig. 4 is a view of the device including mechanism for changing the speed of the pointer according to a change in the scale divisions.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device or system embodying the invention, exemplified in an altimeter, though certain principles thereof are applicable for other devices and purposes. The same may include a casing or support 11 which may be mounted pendulously or by universal means such as gimbals, illustratively indicated by the pivot 12. A pressure sensitive device such as an aneroid 13 is fixedly centrally mounted in the casing as on a supporting element 14. Coaxially connected to the opposite side of the aneroid is a link 15. Pivotally connected to the latter at 16 is the arm 17 of a segmental gear 18 having a fixed shaft at 19. Engaging the gear 18 is a pinion 20 having a fixed axis and serving to rotate an indicator element such as a pointer 21. The altimeter thus constructed, when provided with a scale, forms the usual device heretofore known, and may be compensated for temperature changes, lag or specific hysterisis, counter-balanced as to certain moving parts, and provided with other refinements well known in the art, and which need not be shown herein.

Also provided in the casing 11 is a Venturi tube 22 whose mouth, or entrance 23 faces downward, and the axis whereof is vertical. This venturi may have a relatively long throat 24 to equalize the velocity therein and to cause efficient transformation of velocity head into pressure head in the large cone of the venturi. This transformation occurs gradually so that turbulence is reduced to a minimum. For these purposes the length of the cylindrical portion 24 is between four and six times the internal diameter. If desired, a second Venturi tube 25 like that at 22, but in inverted relation thereto may be provided. Both Venturi tubes may project from the casing 11 at holes 26 so that the mouths thereof are wholly exposed for the flow of air thereinto, and these tubes may be secured to the casing at 26.

To avoid eddy currents at the entrances of the Venturi tubes, and cause the flow thereinto of air actuated by the vertical component of a relatively angular current of air, I provide rectifying means such as 27. The latter may consist of streamlined elements adapted to produce the same amount of pressure at their upper surfaces as at their lower surfaces, so as to afford a neutral or balanced result which shall not affect the Venturi tubes. Illustratively, each element 27 may be of horizontal disc form with upper and lower convexly curved surfaces. Each may have a central vertical opening 28 for receiving the entrance 23 of a Venturi tube with ample clearance, said entrance lying about in the central horizontal plane of the element 27. Each of the latter may be fixedly mounted as by arms or struts 29 connected to any adjacent stationary part in a manner such that wind resistance may be reduced to a minimum. It will be appreciated that the casing 11 may also be so mounted or streamlined as to afford the desired minimum air resistance, and may have suitable openings such as 11a so that the air may flow out of the casing.

Within the expansion cone of each Venturi tube 22 and 25 are axially disposed Pitot tubes 30, 31 whose small ends point toward the cylindrical portions 24 and may lie where the cone begins or within the cylindrical portion, provided that they do not upset the uniform velocity condition sought to be obtained in the portions 24. In this regard, the diameter of the portions 24 must be considered, since a reduction in diameter would substantially increase the effect of the Pitot tube as an obstruction and resistance factor. The shape of the Pitot tube is another factor, and in general it is possible to select various points as above indicated at which the fine end of the Pitot tube may lie. The purpose of the Venturi tube is to increase the dynamic energy of the air or at least to afford the maximum of such energy so that sufficient power may be derived from the Pitot tube for actuation of an instrument. The venturi also affords a uniform stream of air for the Pitot tube. And the venturi has still a further function of serving as a control or adjusting element for the Pitot tube, since each of the latter is slidably mounted as in stationary guides 32 for vertical reciprocation as hereinafter described. It will be evident that as the Pitot tube is retracted so that its point enters the expansion cone of its venturi, the dynamic energy of the air diminishes, and the Pitot tube indicates a reduced velocity head. By associating such an adjustable action with a pressure sensitive device, such as an aneroid, a novel principle is realized because the aneroid can cause retraction of the Pitot tubes in proportion to its contraction. It is well known that the velocity head in the expansion cone of the venturi becomes progressively less toward its outlet, while pressure head increases; hence the Pitot tube pressure diminishes upon retraction. A drop of an aircraft under given conditions, in the case of a storm as mentioned, would cause a substantially higher pressure in a Pitot tube, at relatively low altitudes, than the same drop at high altitudes because the air has less density in the latter case. Hence the Pitot tube pressure might be considered to show that the drop in the former instance is much greater than is actually true. Consequently for the lower altitudes the relatively contracted aneroid has retracted the Pitot tube to a suitable point from the cylindrical section of the venturi, at which point a lower velocity head prevails, to cause a reduced Pitot tube pressure, so that the pressure at the relatively low altitudes shall be consistent with those at the high altitudes, for the conditions above stated. Thus the varying density of the air is substantially eliminated as a factor.

A different or the same aneroid 13 may be used to actuate the Pitot tubes. For example, a plurality of levers may be used, with any desired leverage according to the relative motion desired as between the aneroid and the tubes. It may be desirable to cause a greater motion for the tubes than the expansion of the aneroid. Hence a lever 33 having a fixed pivot at 34 may be connected by a link 35 to a substantially central point of the aneroid, adjacent to the link 15. Pivotally connected to the lever 33 at 36 is a lever 37 having a fixed pivot at 38. The Pitot tube 30 is connected to the pivot element 36, and the tube 31 is connected to the lever 37 by a pivot element 39. Suitable lost motion may be provided where necessary for operation of the levers, and counterbalancing means may be afforded where desirable, but these elementary matters need not be discussed in detail herein.

To transform the energy obtained from the Pitot tubes into mechanical power, a diaphragm or piston 40 is employed in a casing 41. The area of piston is as large as may be required to obtain the necessary power. This piston may be normally maintained in a given or central position, as by opposed, relatively weak, expansion coil springs 42 which are mounted, for instance, on the piston rod 43. The Pitot tubes 30 and 31 are connected to the casing 41 at opposite sides of the piston by pipes 44, 45. For this purpose the portions 44a and 45a of the levers 33 and 37 may be tubular, and the pivots at 34, 36, 38 and 39 may also be tubular, all so arranged as to afford continuous conduits from the Pitot tubes. It will now be apparent that the piston 40 will move according to the differential pressure, against the force of one or the other of the springs 42.

By means of piston 40 the net effect is obtained of conditions where there is a sudden drop in barometric pressure so that the altitude of an aircraft diminishes and then the pilot causes the aircraft to climb to overcome in whole or in part the loss of altitude mentioned.

Movement of the piston to the right or left of neutral initiates operation of a suitable clock or time mechanism, which may comprise a source of power such as a spring wound motor 46 actuating a gear 47 which engages a pinion 48 fixed to the gear 49, the latter engaging a gear 50 to which is secured a bevel gear 51 that is in engagement with a like gear 52. Rotation of the latter causes operation of any suitable escapement or speed control or regulator device 53 herein schematically shown, whereby operation at constant speed is obtained. To vary the constant speed any suitable governor 54, schematically shown, is connected by means of a beveled pinion 55 to the gear 52. Controlling the governor 54 is a cam means 56 or other device affixed to the piston rod 43, which may have a bearing at 57. The cam means may include two aligned cones whose small ends are connected together to cause one or the other of the cones to change the setting of the governor 54. If the piston moves in either direction the cam means 56 will act on the governor to cause an increase in speed of the gear train referred to. In proportion as the movement of the piston 40 is greater or less, in either direction, the increase in speed of the gear train will be correspondingly greater or less.

Operated by the gear train is a gear driver 58 for a pointer, dial or other indicator element. This gear 58 may be releasably engaged with the said gear train by a movable gear 59 or by a movable gear 60, whose movement is responsive to the piston 40 as hereinafter described. The gear 60 may be engaged with a gear 61; both gears 59 and 61 are engaged with a large gear 62 that engages the pinion 48. It will now be seen that the gears 59 and 60 rotate in opposite directions, so that the gear 58 is rotated in one or an opposite direction depending upon which of the gears 59 and 60 engages the gear 58. It will be appreciated as the description proceeds that one of the gears 59 and 60 may be omitted, as it will suffice that the indicator element turned by the driver 58 shall rotate in only one direction. It is to be noted that the gearing and gear ratios herein shown are merely illustrative or suggestive and may be modified to suit.

Controlling the movement of the gears 59 and 60 are the solenoids 63, 64 which are fixedly mounted and are provided with cores operatively mounting the gears so that they remain constantly in engagement with their respective gears 62 and 61, and yet are movable into engagement with the gear 58. In operation one or the other of the gears is in engagement with the gear 58. If both solenoids are deenergized, both of the gears 59 and 60 may be moved into engagement with the gear 58 whereby the gear train becomes locked and automatically stops. Such movement may be caused by expansion coil springs 65 cooperating with the solenoid core mountings to project them for movement of the gears 59, 60 into engagement with the gear 58. Selective operation of the solenoids may be caused by a switching device which may include switches 66, 67. The latter may comprise a common Z-shaped, sliding contact switch member 68 mounted on the piston rod 43. Circuits 69, 70 connect the respective switches 66, 67 with the respective solenoids 63, 64. A common source of current 71 may be provided. It will now be clear that movement of the piston rod 43 leftward causes the switch 67 to close, and movement thereof rightward causes the switch 66 to close. Either switch remains closed while such movement continues. In neutral position of the piston 40, both switches are open and the solenoids 63, 64 are deenergized. If the piston 40 moves to the left and closes the switch 67 the gear 60 disengages the gear 58; the gear 60 then becomes merely an idler, and rotation of the gear 58 by the gear 59 begins. Of course the speed of rotation of the gear 58 will be affected by the governor 54, since the gears 59, 60 are driven by gears which connect with the gear 55.

One form of a device for the practical utilization of the data afforded by the device 10 is shown in Fig. 2. The same shows particularly the face of an instrument 73, which may comprise a pointer 72 that turns with the pinion 20. Cooperating with the pointer are the dials 74, 75 of which the dial 75 may be relatively stationary, and the dial 74 rotatable about the axis of the pointer. This rotary dial 74 may be driven by the gear 58 and it turns clockwise. Normally the zero of the dial 74 coincides with that of the dial 75. Resetting of the dial 74 to such a position is desirable. Hence the casing of the instrument 73 may carry a pinion 76 actuable by a knob 77 and engaged with a gear portion 78 of the dial 74. Also release between the latter and the gear 58 must be provided, and this may be done by means of clutch element 79 frictionally engaging a ring element connected to the dial 74 and of which the gear portion 78 may form a part. To avoid the resistance of the gear 76 when the clutch 79 is turning the dial 74, a conventional reciprocatory mounting may be used whereby the knob 77 may be moved to axially shift the gear 76 into or out of engagement with the gear 78. The normal position is one of disengagement.

For use in very cold weather, the casing 11 may be heated by any suitable thermostatic means, or heat may be applied directly to the Venturi tubes at the throat portions 24 thereof as indicated at 80. Preferably the heating means is remote from the expansion cones to prevent increased resistance of air by expansion due to heat. Hence the heating means is applied adjacent to the entrance portions 23 and it serves to prevent icing in the Pitot tubes.

A typical use of the instrument will now be briefly described, for horizontal flight. With the dial 74 set so that its zero is at the zero of the stationary dial 75, the pointer 72 affords indications of altitude under normal conditions, as heretofore. If a sudden drop in barometric pressure occurs, this will be indicated by movement of the scale 74 clockwise, and will continue as long as that condition obtains and the aircraft continues to lose altitude due to decreased density and buoyancy of the atmosphere. Of course the pointer 72 moves to show a higher altitude, but the scale 74 shows that this is not so, and indicates the drop. Thus if the zero of scale 74 moves to numeral 2 on scale 75, the decrease in altitude is 2 units. If the pointer 72 is read against scale 74, then the result obtained is the approximate net or actual altitude. A highly beneficial result is obtained even if the pointer and the scale 74 are not thus coordinated. Although the airplane is in flight, the vertical component of relative air speed enters venturi 22 with the aid of the rectifier 27 and affects Pitot tube 30 causing piston 40 to move leftward so that switch 67 is closed and solenoid 64 is caused to retract gear 60 from gear 58, permitting the latter to be operated by the timing means, which, however, is regulated by governor 54. The speed of the latter may be increased by the cam 56 actuated by piston 40 in proportion to the vertical energy of the air. The aneroid 13 actuates Pitot tube 30 to cause that energy to so affect the Pitot tube as to allow for varying air density, moving the tube upward at low altitudes and downward at high altitudes. The instant indication of the pointer 72 may jump considerably on a sudden drop in barometric pressure, while the dial 74 may move at a much slower rate. In that case the pointer cannot be read on the dial 74, but after a lapse of sufficient time, or after the dial 74 has become stationary, indicating no further decrease in altitude, the pointer 72 may be read with significance on the dial 74. Or the pilot may note the indication of the dial 74 against the dial 75, showing for example 2 units loss of altitude. He may use his watch and find the time during which this loss has occurred and consult a chart prepared for his aircraft to thus obtain an indication of the drop of barometric pressure. Now he can gage the meaning of the reading of the pointer 72 on the dial 75. An additional means may be provided as will now be described so that the pilot may correct the altimeter for direct reading of the pointer for the new barometric pressure.

In Fig. 3 is shown an instrument 81 like that of Fig. 2, but having a third dial 82 rotatable by a central knob 83 and being otherwise stationary. This dial 82 may be calibrated for barometric pressure, or for units of altitude. From his chart, as above mentioned, the pilot may now move the altitude dial 82 so that the pointer 72 when read thereon indicates the true altitude. If desired, the knob 83 may carry indications 83a for barometric pressure and may be geared to the dial 82 to set the same for the correct altitude, but such mechanical connections between altitude and barometric scales are well known in the art and need not be shown herein.

If the dial 74 carries a barometric scale instead of an altitude scale, then the dial 75 may be made rotatable by a setting knob such as 83 geared thereto. In that case the knob 83 would be turned until the barometric scale 82 indicates the same reading as that of the dial 74, thus setting the scale 75 for a proper reading of the pointer. The indication of the scale 74 may be taken after a predetermined lapse of time, and during level flight.

Continuing with the description of the mode of operation of the device 10, if the aircraft is climbing during a condition of sudden drop of barometric pressure, then the Pitot tube 31 cooperates to impose a pressure on the piston 40 tending to move the same toward the right so that the net effect is indicated by the indicator of Fig. 2.

If the aircraft is flying upward during normal barometric pressure, an indication may be caused by operation of the Pitot tube 31 alone, and the dial 74 may move counterclockwise. For this purpose the invention may serve as a climb indicator. The reverse will also hold true if the aircraft is descending during normal barometric pressure, in which case only the Pitot tube 30 will be operated. The suction, if any, on the other Pitot tube may be negligible or the device may be designed so that it shall be extremely small.

It will be seen that a device embodying the invention may be designed for various conditions by proper selection of gear ratios and by suitable calibration of the scales.

In Fig. 4 is shown a modified drive for the pointer, 72 (which may be regarded as incorporated in Fig. 1) whereby the pointer may travel fast at low altitudes and relatively slowly at high altitudes, the scale divisions of the dial 75 being of correspondingly different sizes. The link 15 of Fig. 1 is connected to a small sector 85 of a gear, engaging a pinion 86 to the stem or pin 87 of which the pointer is affixed. Secured to the sector 85 is a gear 88, engaging a relatively large sector 89 affixed to the gear 86. The arrangement is such that the sector 85 is operative at the low altitudes on scale section 90, while sector 89 is free of the gear 88. As the last tooth of sector 85 is disengaging from the gear 86, the first tooth of sector 89 is engaging the gear 88 for continuity of operation without any lost motion. Then sector 89 operates at the high altitude section. Thus the use of a gear train is avoided and a single scale may have sections 90, 91 having larger subdivisions at low altitude for easier reading of the instrument, and yet permitting small scale divisions for a great altitude range.

I claim:

1. A device for indicating dynamic energy in a stream of air including a Venturi tube, a Pitot tube having a pointed end concentric with the Venturi tube and extending into the expansion cone of the latter and having its pointed end directed toward the throat of the venturi and being movable relatively thereto, an aneroid controlling the movement of the Pitot tube, and an indicator responsive to the air pressure in the Pitot tube.

2. A device including a Venturi tube, means at the entrance thereof for avoiding eddy currents, including a streamlined element extending around the entrance, and having opposite surfaces creating like air pressures at said surfaces, said surfaces being at right angles to the Venturi tube, and a Pitot tube in the expansion cone of the Venturi tube having its operating end adjacent to the throat of the Venturi tube.

3. An indicating instrument having a scale element, a pointer element therefor, the scale element having a continuous scale having successive sections having scale divisions of different spacings, the spacings of each section being equal, an actuator, and gear means having two centers and being operated by the actuator and cooperating with the pointer element to move the same at different speeds consistent with the scale divisions, the gear means including two portions each based on one of said centers and each having a gear sector and a pinion secured thereto, the pinion of one portion being engageable with the sector of the other portion, while the pinion of the other portion disengages its sector.

4. A device for indicating dynamic energy in a stream of air including a pair of units, each unit comprising a Venturi tube and a Pitot tube having its pointed end concentric with the Venturi tube and extending into the expansion cone of the latter with its pointed end directed toward the throat of the Venturi tube, and being axially movable relatively thereto, the units being so arranged relatively to each other that the pointed ends of the Pitot tubes extend in opposite directions, an aneroid, means whereby the aneroid causes movement in opposite directions of the Pitot tubes, and an indicator responsive to the differential of the air pressures in the Pitot tubes.

WILLIAM NAIDA.